Sept. 1, 1959     VALENTINE BOVIE     2,901,838
BORN KRIVOUSSIEFF
DEVICE FOR TEACHING DANCING
Filed March 1, 1956
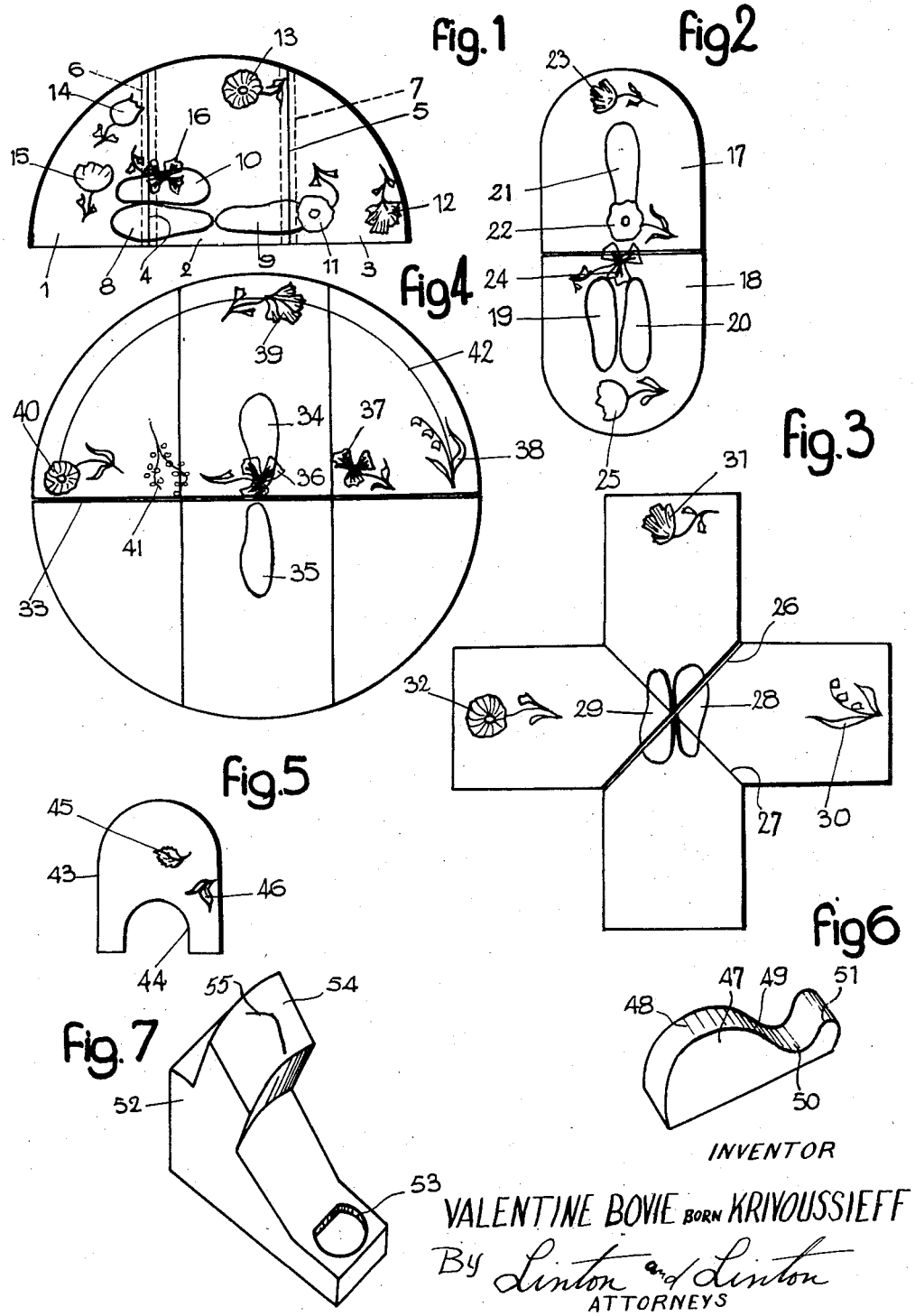
INVENTOR
VALENTINE BOVIE BORN KRIVOUSSIEFF
By Linton and Linton
ATTORNEYS

United States Patent Office 2,901,838
Patented Sept. 1, 1959

2,901,838

DEVICE FOR TEACHING DANCING

Valentine Bovie, born Krivoussieff, Chatou, France

Application March 1, 1956, Serial No. 568,838

Claims priority, application France November 30, 1955

2 Claims. (Cl. 35—29)

This invention relates to dance teaching and has particular reference to a material constituting an auxiliary means for teaching classical dancing, whereby the pupil can easily and correctly perform the exercises of a method elaborated for using this material and enabling the pupil to understand very easily the movements to be accomplished and also to check whether these movements are exactly those prescribed by the method.

The material according to this invention comprises on the one hand a number of small boards to be laid on the floor and corresponding to different exercises, each board having indicia thereon representing the initial positions of the feet as well as adequate marks indicating the locations where the feet must be laid properly performing the dance movements of the relevant exercises.

This material comprises on the other hand supports adapted to be laid on the aforesaid small boards at well defined locations and to receive the foot after it has been moved away from an initial position in order properly to position this foot.

Since the floor space required when using certain boards is relatively important these boards, according to this invention, may consist of two or more separate elements laid on the floor at spaced locations. Moreover, each board or board element may consist of two or more flaps collapsible upon one another about suitable selected folding lines whereby the flaps may be superposed under minimum over-all conditions when it is decided to stow away the material, for example in a box, so that this operation may take place without difficulty.

According to another feature of this invention, a set of small boards constructed according to the general principles set forth hereinabove for the initial teaching of the positions and movements of the feet, may comprise:

(1) A semi-circular small board consisting of three flaps adapted to be folded back about folding lines extending at right angles to the diameter-forming side of the board;

(2) An elongated small board consisting of a pair of flaps adapted to be folded back about the smaller axis of symmetry;

(3) A circular small board consisting of two separate semi-circular elements each consisting in turn of three flaps adapted to be folded back upon the central flap about folding or hinge lines extending at right angles to the diameter connecting the semi-circular elements;

(4) A cross-shaped small board having four equal arms and consisting of two elements hingedly connected along a diagonal connecting two opposite inner vertices, each element comprising two adjacent arms and being adapted to be folded about the other diagonal to superpose the two arms on each other;

(5) A smaller board having a notch formed therein and adapted to be superposed on one of the preceding boards.

These small boards may be made of any suitable material, preferably a rigid and light material such as plywood, wooden fibre panels, synthetic resins or any other equivalent material. The hinged connection between adjacent collapsible flaps or elements may be effected by means of a flexible lining glued on the flap edges, for example an adhesive tape or like material. The lower faces of the boards may be lined with non-skid devices or material, for example rubber suction-cups or the like.

The different positioning marks to be reproduced on the small boards may have any desired form for example those of various flowers, preferably of different colors, which the pupil will readily distinguish, so as to facilitate the understanding of the lessons.

The attached drawing forming part of this specification illustrates diagrammatically by way of example a few forms of embodiment of the dance teaching material of this invention. In the drawing:

Figures 1 to 5 show a set of five exercise boards, and

Figures 6 and 7 show perspective views of foot supports.

The semi-circular board shown in Fig. 1 comprises three flaps 1, 2, 3 hingedly interconnected so as to be foldable about two lines 4, 5 at right angles to the diameter, a pair of adhesive-tape strips 6, 7 being applied for this purpose along these lines 4, 5, as shown in dotted lines. Indicia representing three footprints 8, 9, 10 are represented on this board, the first and second prints having their heel portion located near the center of the board, the third footprint having the toes located near the center, so that the assembly of footprint marking 8, 9 will represent the initial position of a classical dance, while the assembly 8 and 10 will represent the fifth position. The reference numerals 11, 12, 13, 14, 15, 16 designate further indicia representing flowers of different types and colors, such as red poppy, corn-flower, daisy, tulip, buttercup, pansy each indicating the position of the feet and the sequence of the movements to be accomplished by the person using said board.

The board of Fig. 2 is designed for studying low kicks, and comprises a pair of flaps 17, 18 with indicia representing footprints 19, 20, 21 and flowers 22, 23, 24, 25 (for example: poppy, corn-flower, pansy, buttercup).

The cross-shaped board of Fig. 3 comprises two half-portions laid side by side along a common diagonal 26, each half-portion comprising a pair of adjacent arms of the cross and being adapted to be folded back about the diagonal 27. Centrally of the cross are produced thereon side by side indicia representing two footprints 28, 29 in the fifth position, and flowers 30, 31, 32 on the cross arms, as shown.

The board shown in Fig. 4 consists of two semi-circular portions hingedly connected along a diameter 33. Each semi-circular portion consists of three flaps, as in the embodiment of Fig. 1. Indicia representing footprints 34, 35 corresponding to the first position are directed at right angles to the diameter 33, and flowers are also indicated as at 35, 36, 37, 38, 39, 40, 41. Moreover, one of the semi-circular portions has drawn thereon near its outer edge a line 42 for practising the sweeps of the leg.

The board 43 of Fig. 5 is intended for practising low kicks and is formed with a notch 44 corresponding to the footprint indicia of another board of the set, on which this board 43 is adapted to be laid. Positioning marks in the form of flowers 45, 46 may be provided to this end.

The support shown in Fig. 6 consists of a block 47 having an upper bearing surface comprising in the direction from the rear end to the front end of a substantially horizontal but slightly convex portion 48, a rounded concavity 50 adapted to receive the toes of the foot and finally a front rounded edge 51.

The support shown in Fig. 7 comprises a block 52 having in plan view the shape of a trapezoid of increasing width in the front-to-rear direction. The front end of the block has formed therein a circular cavity 53 adapted to receive the foot point of one foot in a forward or rearward position spaced from the other foot with this block having at its rear end an upward projection 54 of which the top surface may carry the impression or trace of the heel contour 55.

To use this material the pupil places his or her feet upon the indicia representing footprints produced on the boards and then carries out the movements dictated by the written and spoken method (book and records) by simply following the marks in the form of flowers or other images. Thus, the position and movements of the feet may be understood without any possibility of error and the pupil may become aware, at least partly, whether the position and movements are correct or not. Anybody conversant with the art will readily understand that this will greatly facilitate the performance of the exercises of the method. On the other hand, by using these rigid boards adapted to be laid on any suitable floor the pupil can practice himself or herself anywhere and at time since his or her practice boards may be unfolded at lesson time and subsequently folded back.

The blocks 47 and 52 are placed upon the footprints such as 8, 9 and 10 in order to place the pupil's foot in the correct desired position.

From the foregoing it will be understood that the forms of embodiment given hereinabove and in the attached drawing are given simply by way of example and should not be construed as limiting the invention for many modifications may be brought thereto without departing from the spirit and scope of the invention as set forth in the appended claims.

What I claim as new is:

1. The material for teaching classical dancing, comprising in combination a plurality of boards of rigid and light material to be laid on a supporting surface and having indicia thereon representing the initial position of the feet and marks indicating the further positions of the feet and the sequence of the movements to be accomplished by the pupil, and separate supports for receiving and positioning the pupil's feet, and said supports having openings for matching with said board markings for correctly placing the pupil's feet on said board.

2. Material for teachiing classical dancing as claimed in claim 1, wherein said board consists of at least a pair of hingedly interconnected flaps adapted to be folded back upon one another for minimizing the size of the board when required.

References Cited in the file of this patent

UNITED STATES PATENTS

| | | |
|---|---|---|
| 233,482 | Delong | Oct. 19, 1880 |
| 1,277,645 | Rothkugel | Sept. 3, 1918 |
| 1,815,443 | Mitchell | July 21, 1931 |
| 2,158,475 | Montine | May 16, 1939 |

FOREIGN PATENTS

| | | |
|---|---|---|
| 549,234 | Germany | Apr. 25, 1932 |